April 15, 1930.    L. STEARMAN    1,754,40
DOLLY
Filed Sept. 12, 1929     2 Sheets-Sheet 1
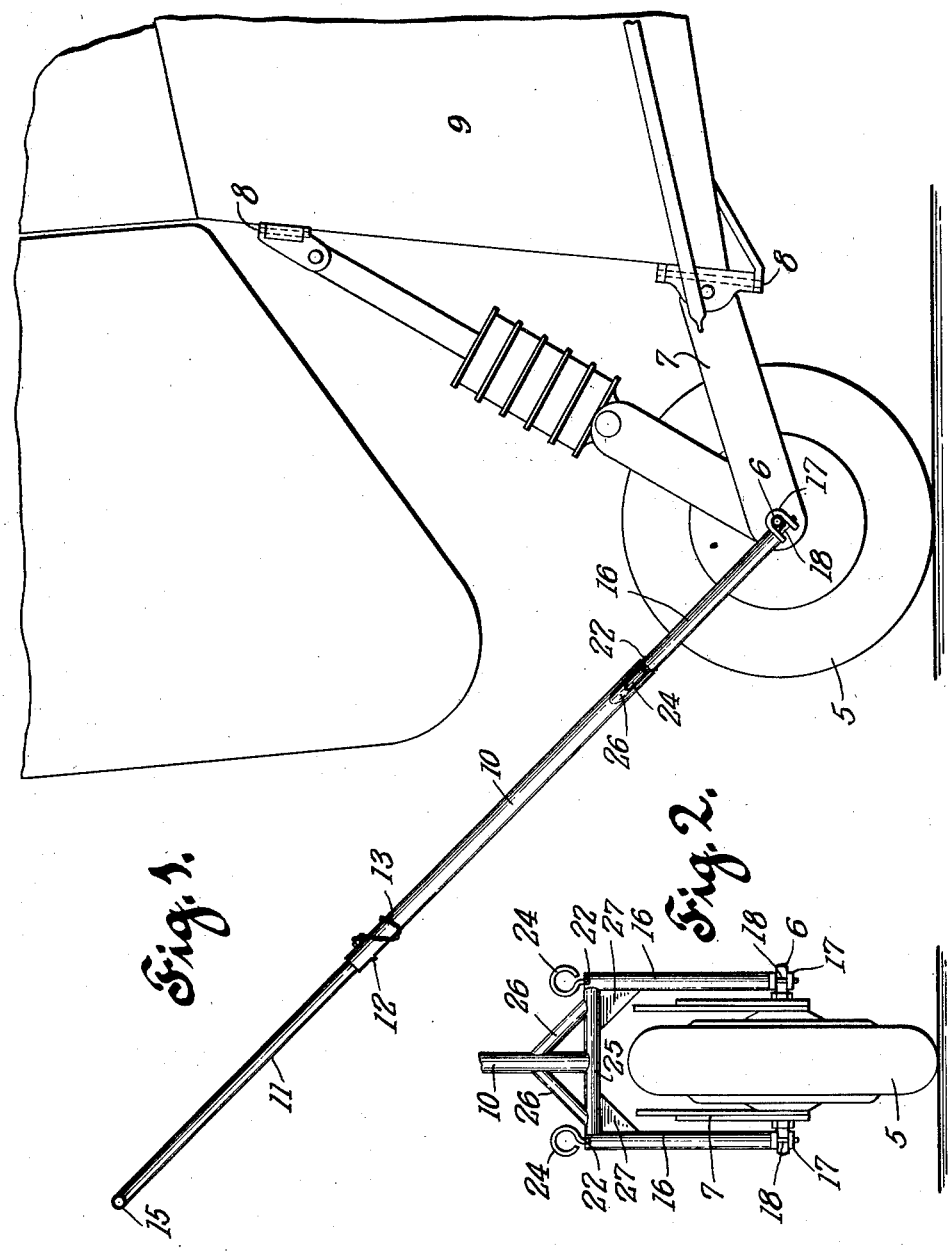
INVENTOR
Lloyd Stearman
BY
ATTORNEY April 15, 1930.  L. STEARMAN  1,754,407
DOLLY
Filed Sept. 12, 1929  2 Sheets-Sheet 2
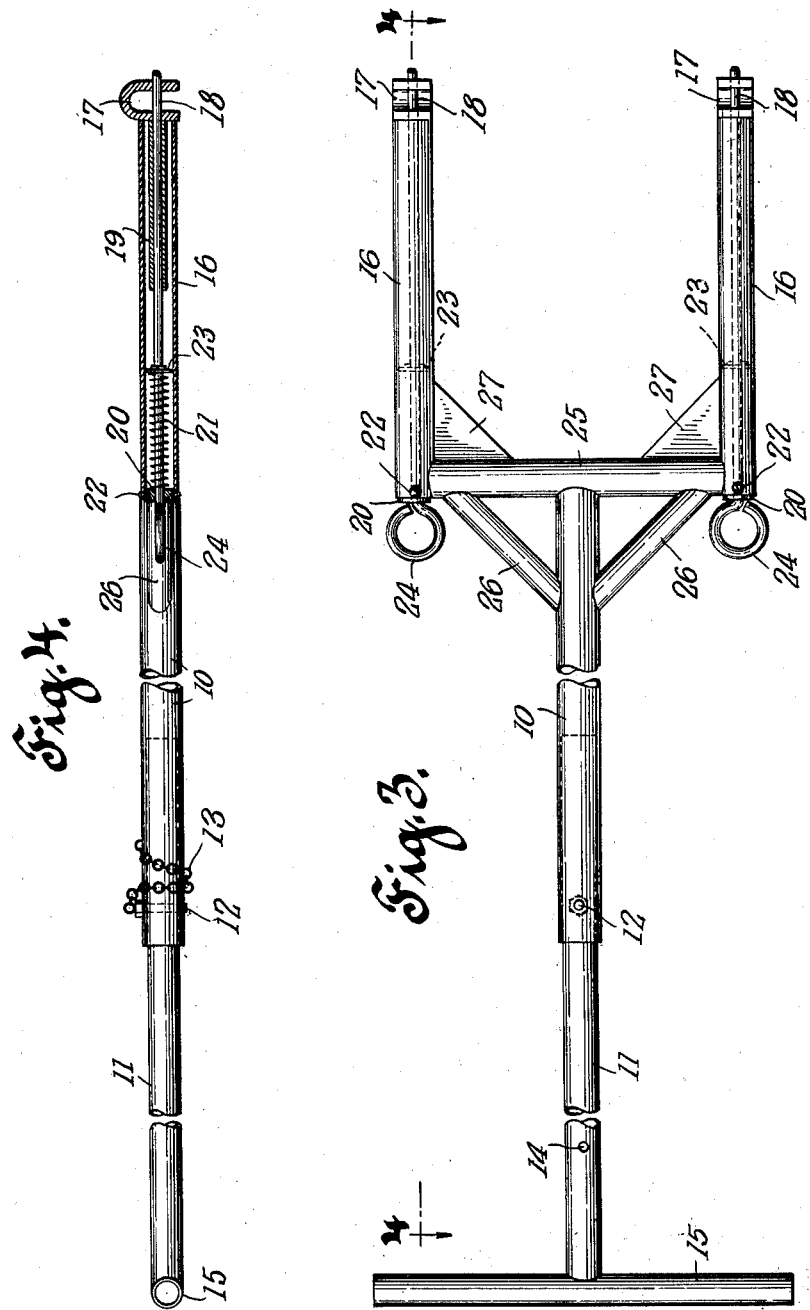
INVENTOR
Lloyd Stearman
BY
ATTORNEY Patented Apr. 15, 1930

1,754,407

UNITED STATES PATENT OFFICE

LLOYD STEARMAN, OF WICHITA, KANSAS, ASSIGNOR TO THE STEARMAN AIRCRAFT COMPANY, INC., OF WICHITA, KANSAS, A CORPORATION OF KANSAS

DOLLY

Application filed September 12, 1929. Serial No. 392,064.

This invention relates to the handling of airplanes and particularly those having wheel skids.

The objects of the invention are to provide a simple form of dolly construction which can be readily hooked onto the wheel skid and used to advantage in shifting the airplane about, on the ground, and to provide this structure in the shape of a light but strong, rigid form of handle mechanism which may be easily applied to the wheel skid.

Further objects and the novel features of construction, combinations and relations of parts by which all objects are attained, will appear as the specification proceeds.

The drawings accompanying and forming part of this specification illustrate one practical commercial embodiment of the invention, but it will be realized that the structure may be modified without departure from the true spirit and broad scope of the invention.

Figure 1 is a broken side elevation showing the dolly handle as applied to the wheel skid of an airplane.

Figure 2 is a broken rear elevation of the same.

Figures 3 and 4 are enlarged broken and part sectional plan views respectively of the dolly handle, the sectional plane of Figure 4 being substantially on the line 4—4 of Figure 3.

The wheel skid illustrated in Figures 1 and 2 comprises the wheel 5 journaled on an axle 6 carried by the skid frame 7, hingedly connected at 8 with the tail portion of the airplane, indicated at 9. The ends of the axle project at opposite sides of the wheel and the dolly handle is constructed to cooperate with these projecting ends.

In the form of the invention illustrated, the dolly consists of a tubular handle body 10 having a tubular extension handle piece 11, telescopically fitting therein and adapted to be secured in the extended relation shown by means of a transverse key pin 12 attached to the handle body by a chain or other suitable flexible connection 13. This construction enables the handle to be extended so as to clear the rudder and other tail surfaces and also enables the device to be collapsed to occupy less space when not in use, the extension handle being shown in Figure 3 as having one or more openings 14 to take the locking pin when it is desired to shorten the handle. A transverse hand piece 15 on the end of the extensible handle enables both hands to be employed in using the device.

Engagement with the axle is effected by forking the handle to arch about the wheel and by providing each branch 16 with a hook terminal 17, open at the bottom as shown in Figure 4, so that it may drop over an extended end of the axle in the manner shown in Figure 1. When thus engaged, these hooks are preferably locked against accidental displacement as by means of the elongated key rods 18 sliding through registered openings in the opposite sides of the hooks. These key rods are slidingly guided in the branches of the fork as by operating in the bearing sleeves or collars 19, 20, in opposite ends of the branches, and they are projected by springs 21 so as to normally close the hooks. The rear or upper bearings 20 are indicated in the form of plugs removably secured in the ends of the tubular branches by the screws 22 and forming abutments for the springs 21. The other ends of these springs act against washers or shoulders 23 on the rods. Upon loosening screws 22 the entire rod assembly, including the end plug 20, spring 21, etc., may be quickly removed. This enables repairs, adjustments or replacements to be readily made. The rear exposed ends of the locking rods are shown as having loops 24, forming stops limiting the spring projection of the rods and serving as finger-holds for retracting the rods.

The tubular branches of the fork are shown connected together at the back by a tubular cross piece 25 braced by tubular struts 26 inclined back to the body of the handle and triangular gussets 27 are shown set in the corners of the fork to overcome spreading tendencies.

The construction disclosed is cheaply made of standard tubular stock, rod and sheet material and is light, strong and rigid. The various parts may be welded or otherwise suitably fastened together. When not in use the handle may be collapsed and when the device is to be used, the handle may be quickly extended. The device is quickly interlocked with the wheel by dropping the hooks down over the axle extensions and then retracting the spring pressed bolts to permit the hooks to fully engage over the axle extensions, the bolts springing back automatically to lock the dolly in position. When so interlocked, the dolly may be employed as a lever to steer or to push or pull the skid wheel, the force being applied entirely to the axle of the wheel.

What is claimed is:

1. A dolly for handling airplanes, comprising a handle structure forked to embrace the skid wheel of an airplane and having hooked terminals for engagement with projecting members such as the ends of the axle of the skid wheel and provided with means for temporarily and releasably fastening said hooked terminals in non-detachable interlocking engagement with such members.

2. A dolly for handling airplanes, comprising a forked handle structure having open hook terminals and bolts slidable across the open hooks for closing said hook terminals over the projecting ends of a skid wheel axle.

3. A dolly for handling airplanes, comprising a handle structure telescopically extensible to different lengths and having terminals engageable in interlocking relation with the projecting ends of a skid wheel axle and means for releasably confining said terminals temporarily in non-detachable engagement with the projecting ends of a skid wheel axle.

4. A dolly for handling airplanes, comprising a handle structure forked to embrace a skid wheel and having open hook terminals and spring pressed bolts for securing said hook terminals interlocked over the projecting ends of a skid wheel axle.

5. A dolly for handling airplanes, comprising a handle structure forked to embrace a skid wheel and having open hook terminals and spring pressed bolts for securing said hook terminals interlocked over the projecting ends of a skid wheel axle, said handle structure having an extensible grip portion and means for firmly securing said grip portion extended to different positions.

6. A dolly for airplane skid wheels, comprising a tubular handle body, a tubular extension slidingly engaged with one end of said body and provided with hand grip means, fastening means for securing the grip member in extended or retracted relation to the body member, a cross piece at the end of the body member, angle braces for said cross piece, tubular branches secured in braced relation to the ends of the cross piece, open hooks on the ends of said branches and slide bolts retractibly mounted in said branches for closing said hooks.

7. A dolly for airplane skid wheels, comprising tubular side members spaced to embrace a wheel skid and terminating in hooks engageable over projecting ends of a skid wheel axle and bolts for closing said hooks on the projecting axle ends, said bolts being slidably mounted in the tubular side members and having pull elements for retracting the same.

8. A dolly for airplane skid wheels comprising tubular side members, plugs removably secured in the ends of said side members, open hooks at the opposite ends of said side members, bolts slidingly guided in said removable plugs and through the open hooks and projecting springs surrounding said bolts and engaging said plugs, whereby upon removal of the plugs said spring pressed bolts may be withdrawn from operating position in the side members.

9. A dolly for airplane skid wheels, comprising a handle structure extensible to different lengths, provided with means for securing the same in different extended relations and provided with open hooks and spring actuating latches cooperating with said open hooks for detachably interlocking the same with projecting portions of an airplane skid wheel.

10. The combination with an airplane skid wheel having an axle with projecting ends, of a dolly constructed for hooked engagement with said projecting ends of the axle and having retractible locking bolt means by which the same may be temporarily secured in interlocked engagement with said projecting axle ends.

11. The combination with an airplane skid wheel structure having projecting members, of a dolly having side members open to receive said projecting members of the wheel skid structure and retractible means on said dolly for temporarily confining said side members in non-detachable engagement with said side members, said means being releasable from a point removed from the point of engagement of said side members with the projecting members.

12. The combination with a wheel skid assembly, having members at the sides of the same for engagement with a dolly, of a forked dolly structure having side members spaced to pass over the wheel skid structure and having side members constructed for inter-fitting engagement with the side members of the wheel skid assembly and latch means on the dolly cooperative with the interfitting side members of the dolly and wheel skid assembly to temporarily lock the same in such interfitting engagement.

13. The combination with a wheel skid assembly, having members at the sides of the same for engagement with a dolly, of a forked dolly structure having side members spaced to pass over the wheel skid structure and having side members constructed for inter-fitting engagement with the side members of the wheel skid assembly, latch means on the dolly cooperative with the interfitting side members of the dolly and wheel skid assembly to temporarily lock the same in such interfitting engagement and said latch means having releasing mechanism operable at a point removed from the points of interfitting engagement aforesaid.

14. A dolly for airplane skid wheels, comprising a light, strong, tubular handle structure and spaced projecting tubular side members with braces securing said side members in rigid spaced relation forming a fork to straddle the wheel assembly and deep downwardly opening hooks on the free ends of said tubular side members providing deep sockets engageable in secure holding relation over projecting members of the straddled wheel skid assembly.

In testimony whereof I affix my signature.

LLOYD STEARMAN.